July 18, 1939.  A. A. BERNDT  2,166,457

RECLAIMING MEMBER AND ENTRANCE GUIDE FOR CONNECTORS

Filed July 28, 1938

INVENTOR.
Arthur A. Berndt,
BY
ATTORNEY.

Patented July 18, 1939

2,166,457

UNITED STATES PATENT OFFICE

2,166,457

RECLAIMING MEMBER AND ENTRANCE GUIDE FOR CONNECTORS

Arthur A. Berndt, Chicago, Ill., assignor to Electroline Company, Chicago, Ill., a corporation of Illinois Application July 28, 1938, Serial No. 221,704

6 Claims. (Cl. 24—126)

The invention relates to improvements in connectors for joining conductors, wires and the like and has more particular reference to an improved reclaiming member which will additionally facilitate the entrance of the wire or conductor within the member and function as a vibration damper during use.

The connector shown in my Patent No. 2,063,-718 consists of a cylindrical casing having tapered end portions which house gripping members in the form of wedges. The wedges grip the wire inserted within the casing with increased force as the tension on the wire increases. However, the wires are not cut or injured and the connection will have a conductivity equal to or better than an equal length of conductor. In order to release the wires from the connector it has heretofore been necessary to insert a separate reclaiming tool within the casing either through a hole in the casing or through the end opening, said tool operating to expand the wedges and thereby permit the wires to be withdrawn.

It is an object of the invention to provide an improved reclaiming member which will be unitary with the connector so that the same can not become lost, which will always be in a position ready for use, although not interfering in the least with the operation of the gripping wedges, and which will not require any separate special tools for its actuation to release the wire.

A further object is to provide a connector for joining wires and the like which will incorporate a built-in reclaiming member and which will additionally function as an entrance guide to facilitate insertion of the wire.

In joining stranded wires or cables to connectors such as described difficulty has been experienced in that the outer strands of the cable separate and flare or broom outwardly, making it difficult or impossible at times to insert the conductor within the end of the connector. Also the gripping wedges are arranged in sets of two or more and insertion of a stranded cable having wires tending to spread or flare often results in a wire or strand entering the space between the wedges or between wedges and the casing, thus interfering with their normal operation and preventing a secure grip on the conductor.

The reclaiming member of the invention in functioning as an entrance guide will confine the flaring wires of a stranded cable and direct the same into the opening provided by the wedges. Also the reclaiming member is free to travel rearwardly with the wedges during the insertion of the conductor and therefore the guiding of the conductor is continuous during this operation.

Another object of the invention is to provide a connector having a reclaiming member unitary therewith and which during the period of use of the connector will act as a vibration damper by absorbing vibrations at a point away from the gripping members, thus preventing failure of the conductor due to metal fatigue where the same joins with the gripping wedges.

Another object is to provide an improved reclaiming member which will have a tapered tip so that the same may be pulled over obstructions such as cross arms and the like.

With these and various other objects in view, the invention may consist of certain novel features of construction and operation, as will be more fully described and particularly pointed out in the specification, drawing and claims appended hereto.

In the drawing which illustrates an embodiment of the invention and wherein like reference characters are used to designate like parts—

Figure 1:
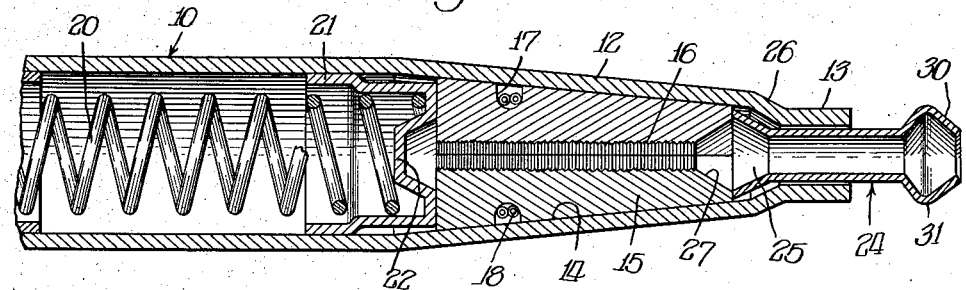
Figure 1 is a fragmentary sectional view of a connector for joining wires or cables showing the same equipped with the improved reclaiming member, entrance guide and vibration damper of the invention.

The connector shown in the drawing is similar in construction and in operation to the device disclosed and claimed in my Patent No. 2,063,718 granted December 8, 1936. The casing or tubular housing 10, which may be of any suitable metal, is formed with tapering portions 12 on the respective ends thereof, each portion having a further reduction at its extreme outer end, as at 13, forming a retaining nose at each end of the connector for purposes to be presently described. Located within the casing 10 are two sets of gripping elements, each set consisting of two or more members having contact with the tapering walls 14 of its respective end portion. Each member 15 is in the form of a wedge and is provided with a trough or groove extending lengthwise thereof and suitably roughened by means of teeth or serrations 16. Also each member on its exterior surface is formed with a transverse groove 17 for receiving several strands 18 of spring wire which yieldingly holds the gripping wedges in associated relation to form a set of two or more, as the case may be, and which will have movement as a unit within the casing during the operation of inserting conductors such as 19 and 20.

The coil spring 20 is located within the casing and confined between the two sets of gripping elements. Between the respective ends of the coil spring and associated gripping elements there is located a cup-shaped member 21 having a recessed base as at 22 for centering the wire held by its respective gripping elements. The diameter of the open end of each cup member is such as to permit the member to have free sliding movement within the center portion of the casing 10, whereas, the base portion of each member is somewhat smaller in diameter in order to allow said base to fit within the tapering portion of the casing when the gripping elements are inoperatively positioned. This construction permits maximum longitudinal movement of the spring and gripping elements.

The improved connector of the invention is provided with a reclaiming member identified in its entirety by numeral 24 and which provides an entrance guide facilitating the insertion of a wire or conductor within the gripping elements and which additionally functions as a vibration damper during use of the connector. The reclaiming member is retained in the end of the connector through the instrumentality of the retaining nose 13 or the like and therefore said member can not become lost and is always in position ready for use. Said member essentially consists of a sleeve having its inwardly directed end flared as at 25 and which flared end retains the sleeve within its respective end of the casing. It will be noted that said flared end 25 has substantially the same angle as the diagonal wall 26 of the casing. The diameter of the flared end 25 approximately coincides with that of the small end of the gripping elements when said elements are inoperative, that is, when said elements are not in gripping relation with the conductor. It will therefore be understood that movement of the member 24 in a rearward direction will at all times cause movement of the gripping wedges also in a rearward direction.

To join a conductor with an end of the connector equipped with the self-contained reclaiming member of the invention, the conductor is first inserted within the sleeve 24 which functions as an entrance guide since the passage provided by said sleeve is in direct alignment with the bevelled opening provided by the gripping wedges. The end of the conductor is therefore caused to enter the longitudinal opening and which is further facilitated by the bevelled edges 27 of the gripping wedges. Before the conductor can enter the wedges it is necessary that they travel rearwardly for some distance against the tension of the spring 20, which movement will permit the wedges to expand so as to accommodate the conductor. However, sleeve 24 will follow the rearward movement of the gripping elements and thus the guiding of the conductor is continuous during the operation of inserting the conductor into the gripping members.

In joining stranded wires or cables 20 to connectors such as described, it has been difficult to properly confine the flaring or broomed ends of the stranded conductor, which is necessary to facilitate the entrance of the same within the end opening of the connector and the opening provided by the gripping elements. The improved reclaiming member, entrance guide and vibration damper will materially aid in the insertion of stranded conductors since said member in providing a continuous guide therefor will confine the flaring ends of the stranded conductor until they are caused to enter the opening provided by the gripping elements. In this operation the travel of the member rearwardly with the gripping elements is important and due credit must be given to this feature for the satisfactory performance in joining stranded conductors.

Figure 2:
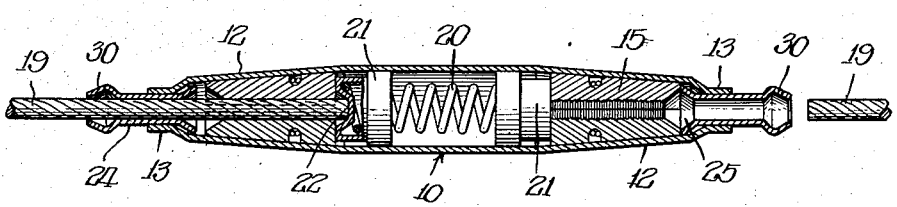
Figure 2 is a sectional view taken longitudinally of the connector embodying the invention and showing a conductor joined at one end thereof.
Figure 3:
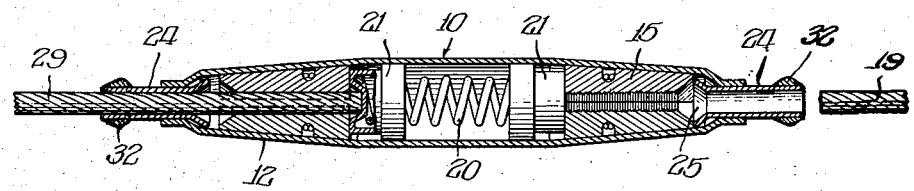
Figure 3 is a sectional view similar to Figure 2 but showing a stranded conductor gripped by one set of wedges.
Figure 4:
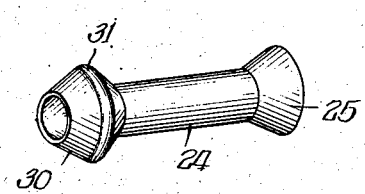
Figure 4 is a perspective view of the improved reclaiming member, entrance guide and vibration damper of the invention.

The projecting end of the present reclaiming member is provided with a tapered tip 30 so that the connector can be pulled over cross arms and similar obstructions. As shown in Figures 1 and 2, said tapered tip is formed by enlarging the diameter of the sleeve, which enlargement reaches its maximum size at 31 and then reducing the diameter of the same to form the tip end. As shown in Figure 3, the sleeve 24 has the same diameter throughout its length and the tapered tip is formed by applying to the outer end of said sleeve a quantity of metal 32 and tapering the exterior surface of the same. In the work of installing an electrical conductor or wire it is very often necessary to pull the wire, causing travel of the same over obstructions such as cross arms and the like. By forming the tip of the present reclaiming member as described the said connector will readily pass over obstructions of this nature. Also in the act of reclaiming the wire the bulbous portion 31 has utility as the same may be readily grasped by the lineman to cause rearward movement of the said member.

The present reclaiming member may be applied to dead end connectors such as shown in my Patent No. 2,105,178 as well as line splices. In both line splices and dead end connectors the vibrations of the wire are believed to cause fatigue at the initial point of contact between the same and the gripping elements. This is based on the assumption that this is the point of greatest compression. The sleeve 24 during use of the connector functions as a vibration damper at a point where the conductor is compressed and thus removes the seat of vibration from the compressed section, thereby eliminating this metal fatigue. The wire does not fatigue where it contacts the sleeve since it is not under compression at this point, as is the case with that portion of the wire held by the gripping elements. The construction makes for a practical connector for anchoring wires to a fixed support or other anchorage and will fulfill all requirements of service.

Rearward movement of the gripping wedges to release the wire and reclaim the connection is accomplished by causing rearward movement of sleeve 24, which movement is of course transmitted to the wedges, and the same may be easily held in their rearward position until the wire is withdrawn. This function of the sleeve 24 determines the length of said sleeve since the same must be long enough to impart rearward movement to the wedges beyond that position which they assume when in gripping relation with the wire. In the operation of reclaiming the connector the flared end 25 of the sleeve will enter the bevelled opening of the wedges. This helps to expand the gripping means and in doing so aids the release of the wire gripped thereby. However, there is no interference with the operation of the wedges and when the wire has been withdrawn and the sleeve released, the wedges will move forward into the tapered end of the casing.

The present reclaiming member is unitary with the connector and therefore can not become lost. Its position within the nose end of the connector does not interfere in the least with the operation of the gripping wedges although the member is always ready for use, can be manually actuated, and therefore does not require any special tools to release the wire. In joining solid conductors the sleeve 24 prevents the insertion of conductors which may have excessively burred ends or bent or kinked ends. This is desired as only conductors having a straight end will properly co-act with the wedges to form a secure joint. Also the sleeve in functioning as an entrance guide prevents insertion of over-size conductors.

This application is a continuation-in-part of my co-pending application Serial No. 190,384 filed February 14, 1938.

The invention is not to be limited to or by details of construction of the particular embodiment thereof illustrated by the drawing, as various other forms of the device will of course be apparent to those skilled in the art without departing from the spirit of the invention or the scope of the claims.

What is claimed is:

1. A connector of the character described, in combination, a tubular casing having a tapering end portion, gripping means within said tapering end portion for receiving and gripping a wire, and a member retained by the end of said casing, said member being constructed and arranged to have limited movement in a direction axially of the casing whereby the same is operative upon rearward movement to release the wire held by the gripping means, the outer projecting end of said member having a tapered tip formed thereon so that the connector may pass over obstructions and the like.

2. A connector of the character described, in combination, a tubular casing having a tapering end portion, gripping means within said tapering end portion for receiving and gripping a wire, a member retained by the end of said casing and having operation upon rearward movement thereof to release the wire held by the gripping means, whereby said connector may be reclaimed, said member also functioning as an entrance guide facilitating the insertion of the wire within said gripping means, and the outer projecting end of said member having a tapered tip formed thereon so that the member will not interfere with movement of the connector over cross arms and similar obstructions.

3. A connector of the character described, in combination, a tubular casing having a tapering end portion, gripping means within said tapering end portion for receiving and gripping a wire, a member retained by the end of said casing and operative upon rearward movement thereof to release the wire held by the gripping means, whereby said connector may be reclaimed, said member during use of the connector functioning as a vibration damper for the connected wire, and the outer projecting end of said member having a tapered tip formed thereon so as to facilitate movement of the connector over cross arms and similar obstructions.

4. A connector of the character described, in combination, a tubular casing having a tapering portion at one end thereof terminating in a retaining nose, gripping means within said tapering portion for receiving and gripping a wire, a sleeve retained by said nose in a manner permitting limited movement thereof in a direction axially of the casing, said sleeve receiving the wire and providing an entrance guide by directing the same toward the gripping means, said sleeve being operative upon rearward movement thereof to release the wire held by the gripping means so that the connector may be reclaimed, and a tapered tip formed on the outer projecting end of said sleeve to facilitate movement of the connector over cross arms and similar obstructions.

5. A connector of the character described, in combination, a tubular casing having a tapering portion at one end thereof terminating in a retaining nose, a set of gripping members located within said tapering portion and engaging the walls thereof, said set of gripping members having a bore extending longitudinally thereof for receiving a wire inserted within said tapering portion, a sleeve retained by said nose and constructed and arranged to have limited movement in a direction axially of the casing, the inner end of said sleeve being flared and having co-action with the adjacent end of said gripping members to facilitate the insertion of a wire within said set of members, said sleeve also being operative upon rearward movement thereof to release the wire held by said gripping members whereby said connector may be reclaimed, and means forming a tapered tip on the outer projecting end of said sleeve to facilitate movement of the connector over cross arms and similar obstructions.

6. A connector of the character described, in combination, a tubular casing having each end tapered to form tapering portions, each tapering portion being further reduced in diameter at its outer end to form a retaining nose, a set of gripping members located within each tapering portion and engaging the walls thereof, means positioned between the sets of members for maintaining them in contact with their respective walls, each set of gripping members having a bore longitudinally thereof for receiving the wire inserted within its tapering portion, a sleeve at each end of the casing retained by its respective nose, each sleeve being constructed and arranged to have limited movement in a direction axially of the casing, the inner end of said sleeve being flared and having co-action with the adjacent end of said gripping members to facilitate the insertion of a wire within said set of members, said sleeve also being operative upon rearward movement thereof to release the wire held by said gripping members whereby said connector may be reclaimed, and means forming a tapered tip on the outer projecting end of said sleeve to facilitate movement of the connector over cross arms and similar obstructions.

ARTHUR A. BERNDT.